United States Patent [19]

Bartelink

[11] Patent Number: 4,888,660
[45] Date of Patent: Dec. 19, 1989

[54] SHOCK-PROOF MAINS VOLTAGE SUPPLY OUTLET AND METHOD

[75] Inventor: E. H. B. Bartelink, Concord, N.H.

[73] Assignee: Academy of Applied Science, Concord, N.H.

[21] Appl. No.: 208,268

[22] Filed: Jun. 17, 1988

[51] Int. Cl.⁴ .................................................. H02H 3/16
[52] U.S. Cl. .......................................... 361/49; 361/42
[58] Field of Search ................ 361/42, 49, 45, 46, 361/47, 48, 50

[56] References Cited

U.S. PATENT DOCUMENTS

| | | | |
|---|---|---|---|
| 3,169,239 | 2/1965 | Lacey | 340/252 |
| 3,368,110 | 2/1968 | Taylor | 317/16 |
| 3,441,799 | 4/1969 | Delafrange | 317/9 |
| 3,706,008 | 12/1972 | Kremer | 317/18 |
| 3,864,581 | 2/1975 | Satyanarayana | 307/92 |
| 3,909,566 | 9/1975 | Morrison et al. | 200/51.07 |
| 4,080,640 | 3/1978 | Elms et al. | 361/45 |
| 4,175,255 | 11/1979 | Linnman et al. | 328/7 |
| 4,306,374 | 12/1981 | Wharrie | 46/33 |
| 4,410,925 | 10/1983 | Tucker et al. | 361/49 |
| 4,484,185 | 11/1984 | Graves | 340/656 |
| 4,520,417 | 5/1985 | Frank | 361/49 |
| 4,584,430 | 4/1986 | Belknap | 174/67 |
| 4,589,047 | 5/1986 | Gaüs et al. | 361/49 |
| 4,722,021 | 1/1988 | Hornung et al. | 361/49 |

Primary Examiner—A. D. Pellinen
Assistant Examiner—Jeffrey A. Gaffin
Attorney, Agent, or Firm—Rines and Rines

[57] ABSTRACT

An improved mains outlet and method of operating the same that automatically and safely distinguishes between the conditions of human or animal contact with the outlet terminals and contact with appliances such as light bulbs and consumer products, to prevent any substantial voltage or power from being drawn in the former case and automatically applies substantially full mains voltage when the appliance is connected to the outlet.

10 Claims, 2 Drawing Sheets

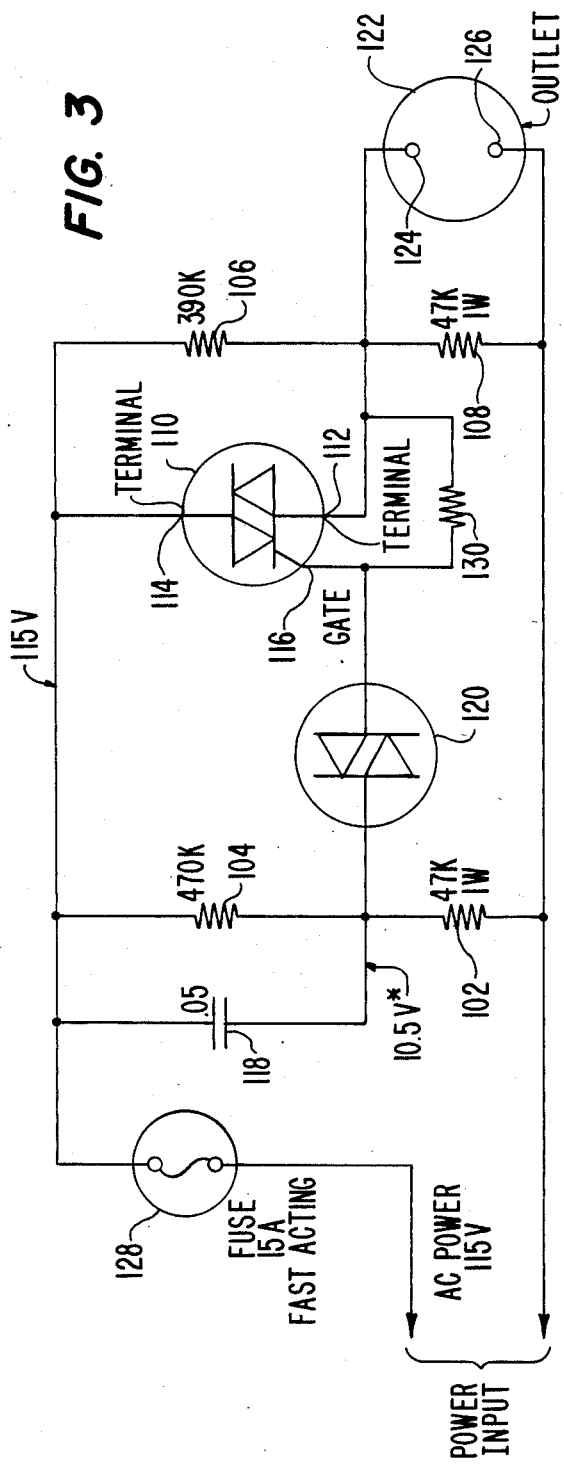

SHOCK-PROOF MAINS VOLTAGE SUPPLY OUTLET AND METHOD

The present invention relates to mains voltage supply outlets used to connect movable appliances to the source of power. This includes those outlets of the type used in residences, offices, businesses, hotels and in public places, to power household and other appliances ranging from lamps to vacuum cleaners, heaters, toasters, hair dryers and similar devices; and is more particularly directed to insuring the safety of such outlet from electrical shock by the inadvertent or misguided purposeful touching of the outlet terminals by children, animals or adults, as may be encountered through insertion of paper clips or nails or even small fingers into outlet apertures and into contact with the metal terminals of the outlet.

Numerous devices have been evolved over the years for mitigating against such dangers including the current use of fixed or movable plastic inserts to cover the outlet apertures and mechanical on-off switches — both requiring human operation or control. Illustrative of prior approaches or attempts at improved plugs and the like are U.S. Pat. Nos. 3,169,239; 3,368,110; 3,441,799; 3,706,008; 3,864,581; 3,909,566; 4,080,640; 4,175,255; 4,306,374; 4,484,185; 4,584,430; and 4,722,021. Most of these devices show methods of disconnecting power from the appliance in case of overload or describe mechanical devices to prevent inadvertent contact with the source of power.

Underlying the present invention, however, is the concept of employing appropriate electronic circuits connected between the mains supply lines and the outlet terminals that, in effect, respond automatically to the impedance presented between the outlet terminals unambiguously to distinguish between a condition where the human body is connected thereto and the condition where an electrical appliance that is to be powered is so connected — insuring automatically that no or only a trivial amount of voltage or power is available in the former case, and substantially full power is connected to the appliance in the latter instance.

An object of the invention, accordingly, is to provide a new and improved mains outlet and method of operating the same that obviate the above-described problems and automatically and safely distinguish between the conditions of human or animal contact with the outlet and appliance contact therewith to prevent any substantial voltage or power being drawn in the former case and to apply substantially full mains voltage in the latter condition.

Other and further objects will be explained hereinafter and are more fully delineated in the appended claims.

In summary, from one of its broader aspects, the invention embraces a method of rendering an outlet connected to a mains power supply safe from shock upon human touching of the outlet terminals, that comprises, sensing the impedance presented between said outlet terminals; responding to said sensing to apply no or very small and "safe" amounts of voltage and power from said supply for sensed impedance values corresponding to the relatively high impedance presented by the human body, wet or dry; and responding to said sensing to apply substantially full supply voltage for sensed impedance values corresponding to the relatively low impedance presented by appliances. Preferred and best mode apparatus and details are hereinafter presented.

The invention will now be described with reference to the accompanying drawings, FIG. 1 of which is a simplified circuit diagram of a part of a circuit useful for the purposes of the invention and which is exemplary to explain the principles underlying the invention;

FIG. 3 is a preferred implementation of the invention.

Figure 1:
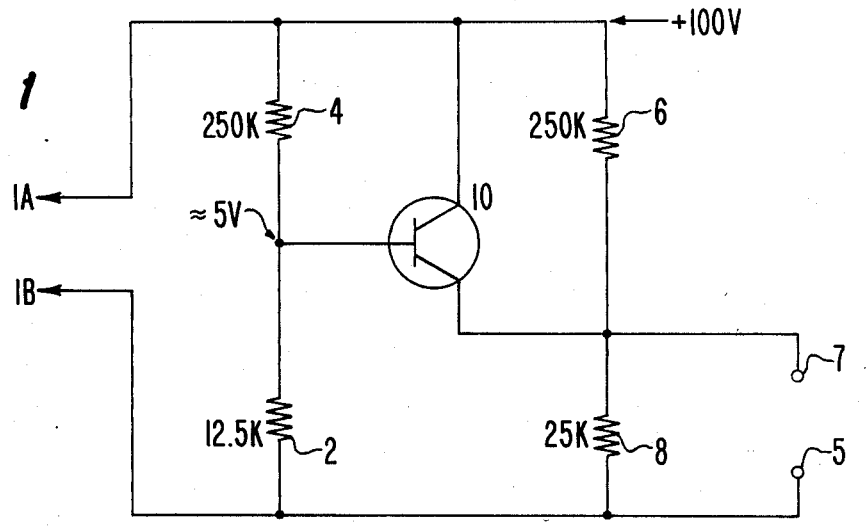

Referring to FIG. 1, some of the principles underlying the invention will be explained in simplified fashion, even though the circuit of FIG. 1 is not commercially adapted for operation without additional refinements as later explained. In this FIG. 1, there is shown a transistor 10 which has its base biased to, for example, +5 volts by resistor 4, which may, for example, be of the order of 250,000 ohms and a resistor 2 which may have a much lesser value of the order of 12,500 ohms, thus reducing the voltage at the base of the transistor to about the said +5 volts. The emitter of this transistor is biased by resistor 6, which may also have a value of the order of 250,000 ohms, and resistor 8, which may be of the order of 250,000 ohms, resulting in an emitter voltage of about +10 volts. Thus the transistor 10 cannot conduct and the voltage at the terminals 7 and 5, which represent the outlet, will remain at a trivial value of only a small fraction of the mains supply voltage such as about 10 volts. So long as the transistor 10 does not conduct, the maximum current from the mains supply 1A and 1B, such as the 110-115 volt or 220 volt supplies used throughout the world, which can flow to terminals 5 and 7 is of the order of a totally safe 0.40 milliamperes. When the external resistance applied to terminals 5 and 7 of the outlet is reduced far below the resistance values of the human body, becomes less than about, say, 500 ohms, the emitter voltage falls below the base voltage and the transistor 10 will conduct. There is then the classical case of an emitter follower operation, wherein the voltage across the outlet terminals 5 and 7 will be equal to the 5-volt base voltage appearing in transistor 10.

The above explains the basic operation of the electronic switching system of the circuit interposed between the mains supply lines 1A and 1B and the outlet terminals 7 and 5, though in actual practice, non-linear devices must be incorporated to produce full power at the terminals 5 and 7 when the impedance presented across the outlet terminals 5 and 7 is less than a relatively low value, of at most a few hundred ohms as prescribed by an appliance.

In accordance with the invention, the outlet 5-7 is rendered safe from shock upon human touching of the outlet terminals 5 and 7 through the interposition of the electronic impedance or resistance sensing and switching circuit such as that in FIG. 1 interposed between the outlet terminals 5 and 7 and the power supply lines 1A and 1B. The electronic switching device 10 of the circuit, as above indicated, is biased to permit no or a trivial and safe amount of voltage and thus power to be passed through the circuit from the power supply lines 1A and 1B to the outlet terminals 5 and 7 when the impedance between the terminals 5 and 7 is relatively high, say of the order of the impedance of the human body when fingers, wet or dry, are touched to the terminals 5 and 7, thereby to prevent any shock. This is somewhat analogous to the trivial voltage applied to toy electric railroad tracks and trains which has long been recognized as a totally safe condition, even for children touching the terminals. As previously indicated, these relatively high impedances have been measured to be of the order of from hundreds of thousands of ohms to several megohms, depending upon the wet or dry condition of the fingers or the portion of the body that becomes connected between the outlet plug terminals 5 and 7. When, however, a load impedance is sensed across the terminals 5 and 7 that is relatively low compared to the above, say, in practice, for lamps and similar electrical devices of the order of a few hundred ohms nd less, the above-mentioned condition of conduction of the transistor 10 takes place and the mains voltage is then applied with substantially full power available to energize the appliance that has been plugged into the outlet as previously described.

Figure 2:
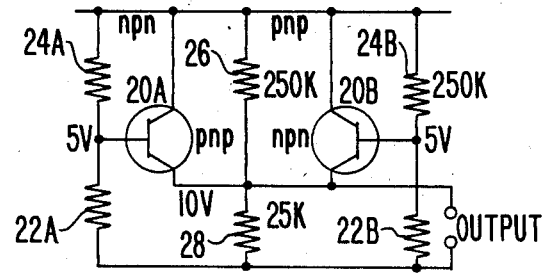
FIGS. 2 and 4 are similar circuit diagrams of modifications.

The circuit of FIG. 1 has been described in simplified form in connection with the positive cycles of the supply voltage applied at the lines 1A and 1B. In order not to lose the energy of the negative half-cycles, this circuit may be combined with a complementary circuit (transistors 20A and 20B) as shown in FIG. 2 to accommodate for the negative half-cycles as well. If a circuit which is symmetrical to ground is desired, the circuit of FIG. 4 containing transistors 30A, 30B, 30C and 30D and corresponding resistor networks 32A through D, 34A through D, 36A and 36B and 38A and 38B may be employed.

In preferred form, however, the switching devices can assume the form of triacs and diacs, which are not polarity sensitive and therefore there is no need to provide multiple circuits such as shown in FIG. 2 to take care of the condition of both the positive and negative polarity half-cycles. Furthermore, mains plug outlets are normally wired with a ground and a hot conductor, at least in the U.S., and there is no need to provide a balanced output in such instances.

The preceding has described the transistor circuits in which the resistor 6 of FIG. 1, for example, will deliver very small current into the high impedance load of the human body touching the outlet and in which the transistor 10 in switching to conduction will deliver additional current of the type necessary to enable powering of a low output impedance device, such as appliance, when it is applied to the outlet terminals 5 and 7. The additional current thus applied to the low impedance device is limited because, in the emitter-follower circuit of FIG. 1, the current in the transistor cannot rise beyond the point where the voltage across the emitter circuit equals the voltage at the base. Thus, in a commercially useful system, to develop effective power in the output circuit for powering the desired appliance when plugged into the outlet terminals 5 and 7, the transistors are supplemented with or preferably replaced by non-linear devices such as the triac and diac type electronic switching illustrated in FIG. 3. Referring to that figure, the triac 110 replaces the transistor 10 of FIG. 1. The triac has terminals 112, 114 and 116. In the data sheets these are generally referred to respectively as "Main Terminal-1" (112), "Main Terminal-2" (114) and "Gate" (116). Critical voltages are the voltages occurring between terminals 112 and 116. The triac, of course, is a device which in its idle condition has a high impedance between its main terminals 112 and 114, and which can be switched to a low impedance device by applying a voltage pulse of a magnitude which exceeds the voltage at the terminal 112 and causes the switching of the triac. This conversion will take place with supply voltage of either polarity.

A voltage divider consisting of resistors 102 and 104 is installed at the gate side and another voltage divider consisting of resistors 106 and 108 is installed in the "mains terminal" side of the circuit. The junction of resistors 106 and 108 is connected to the "Main Terminal-1" (112), and to the output terminal 124 of the outlet shown at 122. The junction of resistors 102 and 104 is connected to the gate 116 of the triac serially through a diac 120, having the property that it presents a very high impedance to currents of either polarity until the voltage across the same has reached a certain threshold; and then, when that voltage is exceeded, the diac becomes a very low impedance device. When the voltage across the diac is reduced to either zero or to a very low value, it reconverts into a high impedance device. As a result of these properties, the diac prevents any significant amount of current from entering the triac gate 116 until the time that the voltage appearing at the junction of resistors 102 and 104 is sensed to be sufficiently high to trigger the triac to its switched conducting mode. A condenser 118 is connected across resistor 104 and the energy stored in the condenser at the time of triggering is applied through diac 120 to the gate 116 of the triac and helps to insure positive triggering of the triac. Because of the external capacities, and specifically because of the capacity between the terminals and the gate, a very short duration spike on the power supply can, in some instances, cause a spike to appear on the gate terminal 116 and such could cause a spurious triggering of the triac. Insertion of resistor 130, which is a low resistance value, prevents such spikes from affecting triac operation. If desired, a protective fuse 128, as shown, may be inserted in the power supply.

The operation of the circuit shown in FIG. 3 is as follows: so long as a high impedance which may consist of parts of the human body is sensed at the output terminals 124 and 126 of the outlet, or when there is infinite impedance or the human body or some portion thereof is connected across those terminals, the voltages appearing at the gate 116 are equal to or lower than the voltage which appears on the "Terminal-1" (112) and the triac cannot conduct. Suitable numerical examples of voltages are shown in the figure. The resistance between the two hands of an adult person measure to be, say, about 500,000 ohms when test leads of a conventional analyzer are squeezed between salt water the moistened thumb and index finger of each hand, resulting in an equivalent resistance between the terminals 124 and 126 of about 43,000 ohms. As a result of the presence of resistance 130 there occurs a voltage of about 11.4 volts at "Terminal-1" (112) and at the gate. In this case the triac will not conduct. In contrast with this, when a 25-watt light bulb is plugged into the outlet terminals, a resistance to ground at terminal 112 and the gate 116 of about 400 ohms is sensed. At this point the voltage across resistor 108 is momentarily reduced to a fraction of a volt. This triggers the diac which in turn triggers the triac which thereafter shows a voltage drop of a fraction of a volt.

The resistance-capacitance values and voltage appearing in the figure are approximate values to those used and observed in experimental apparatus.

Figure 4:
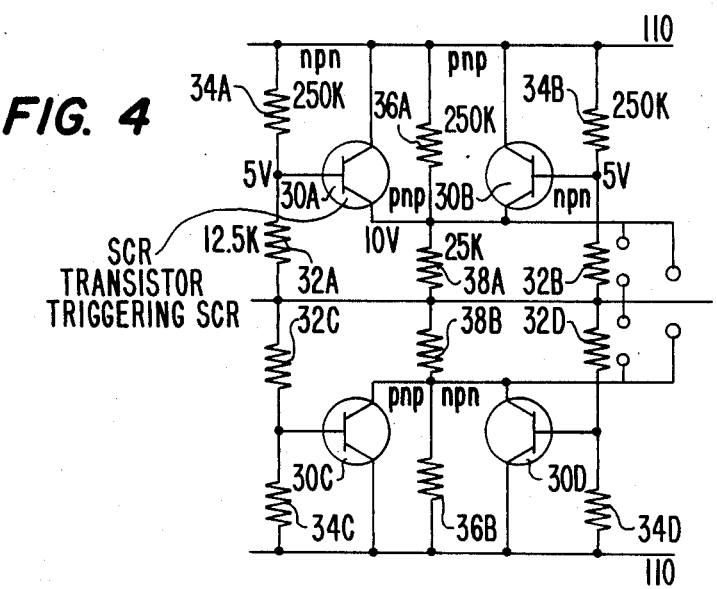

Referring to the before-described FIG. 4, a further transistor version embodying a "symmetrical to ground" output is shown. The transistors in this circuit can be replaced by non-linear devices such as those described in connection with FIG. 3.

In practice, it is to be understood that these circuits may be formed on chips or in very small packages and made integral with the outlet plug itself or can be made in the form of kits to be added to existing mains outlets terminals, extension cords, etc.

Further modifications will occur to those skilled in this art and such are considered to fall within the spirit and scope of the invention as defined in the appended claims.

What is claimed is:

1. A method of rendering an outlet having terminals connected to a mains power supply of predetermined supply voltage safe from shock upon human touching of the outlet terminals, that comprises, sensing whatever impedance may be presented between said terminals; responding to said sensing to apply only a fraction of said predetermined supply voltage from said supply for sensed impedance values corresponding to the relatively high impedance presented by the human body, wet or dry, or by animals; and responding to said sensing to apply substantially full predetermined supply voltage for sensed impedance values corresponding to the relatively low impedance presented by appliances.

2. A method as claimed in claim 1 and in which said fraction of said predetermined supply voltage is adjusted to the order of about 10 volts.

3. A method as claimed in claim 1 and in which said fraction of said predetermined supply voltage is applied during sensing of impedance values between the outlet terminals ranging from infinity down to said relatively high impedance presented by the human body.

4. A method of rendering an outlet having terminals connected to a mains power supply of predetermined supply voltage safe from inflicting shock upon human touching of the outlet terminals, that comprises, interposing an impedance-sensitive electronic circuit between the terminals and the power supply lines, said circuit having electronic switching means; biasing said electronic switching means to permit only a fraction of said predetermined supply voltage to be passed through the circuit from the power supply lines to the outlet terminals when impedances well above several hundred ohms are connected thereacross, as when human fingers, wet or dry, touch the terminals; and adjusting said electronic switching means to become substantially fully conductive to apply substantially full predetermined supply voltage from the supply line to the said terminals when a load impedance less than several hundred ohms, as from electrical appliances, is connected across said terminals.

5. A method as claimed in claim 4 and in which said fraction of said predetermined supply voltage is adjusted to the order of about 10 volts.

6. An outlet having terminals for applying predetermined supply voltage from mains power supply lines to the outlet terminals having, in combination, an electronic circuit interposed between the supply lines and the outlet terminals and comprising electronic switching means to prevent any more than a fraction of said predetermined supply voltage from being applied to said outlet terminals when the impedance presented thereacross is of the relatively high impedance values presented by the human body, and means automatically operable upon the presenting between said outlet terminals of the relatively low impedance values of appliances for causing the switching means to apply thereto substantially full predetermined supply voltage from said supply lines.

7. An outlet as claimed in claim 6 and in which said relatively high impedance values include values of the order of hundreds to thousands of kilohms and said relatively low impedance values include values of the order of hundreds of ohms and less.

8. An outlet as claimed in claim 7 and in which said electronic switching means comprise serially connected triac and diac devices.

9. An outlet as claimed in claim 7 and in which said electronic switching means comprise complementary SCR or transistor devices.

10. An outlet as claimed in claim 6 and in which said fraction of said predetermined supply voltage is of the order of about 10 volts and the resulting current drawn therefrom when such relatively high impedance values are presented between the outlet terminals is of the order of about a milliampere.

* * * * *